(12) United States Patent  
Vincent

(10) Patent No.: US 6,454,206 B2
(45) Date of Patent: Sep. 24, 2002

(54) VIBRATION DAMPING APPARATUS

(75) Inventor: Alan Henry Vincent, Yeovil (GB)

(73) Assignee: GKN Westland Helicopters Limited, Yeovil (GB)

( * ) Notice: Subject to any disclaimer, the term of this patent is extended or adjusted under 35 U.S.C. 154(b) by 0 days.

(21) Appl. No.: 09/794,116

(22) Filed: Feb. 28, 2001

(30) Foreign Application Priority Data

Feb. 29, 2000 (GB) ............................................. 0004649

(51) Int. Cl.⁷ .............................. B64C 27/00; F16F 9/46
(52) U.S. Cl. ..................... 244/17.27; 188/280; 188/318; 188/312; 188/378; 188/266.3; 188/322.15; 267/136; 416/500
(58) Field of Search ........................... 244/17.27, 17.13; 188/280, 318, 322.22, 322.15, 283, 312, 378–380, 266.3, 266.4, 316, 317, 266.1; 416/500, 119; 267/136; 52/167.1

(56) References Cited

U.S. PATENT DOCUMENTS

| | | | |
|---|---|---|---|
| 2,375,377 A | * | 5/1945 | Mitereff |
| 3,638,885 A | | 2/1972 | Reed |
| 4,084,668 A | * | 4/1978 | Rybicki ....................... 188/312 |
| 4,936,423 A | * | 6/1990 | Karnupp ................. 188/322.13 |
| 4,976,454 A | * | 12/1990 | Bohn |
| 5,347,771 A | * | 9/1994 | Kobori et al. .............. 52/167.1 |
| 5,392,882 A | | 2/1995 | Mackovjak et al. |
| 5,462,141 A | | 10/1995 | Taylor |
| 5,586,627 A | * | 12/1996 | Nezu et al. .................. 188/318 |

FOREIGN PATENT DOCUMENTS

| | | |
|---|---|---|
| DE | 93 05 783.0 | 9/1993 |
| EP | 0 601 982 A1 | 6/1994 |
| EP | 0 691 226 A1 | 1/1996 |
| GB | 554732 | 7/1943 |
| GB | 1095020 | 12/1967 |
| GB | 2 154 700 A | 9/1985 |
| GB | 2 341 909 A | 3/2000 |
| WO | WO 92/02382 | 2/1992 |

* cited by examiner

Primary Examiner—Douglas C. Butler
(74) Attorney, Agent, or Firm—Larson & Taylor, PLC

(57) ABSTRACT

A damping apparatus for damping vibrations in a vibrating system including a piston which is reciprocally movable in a fluid filled chamber, piston movement in either direction of movement being resisted by fluid pressure in the chamber behind the piston, which resistance provides damping forces which act to oppose piston movement, the piston being connected to one component of the vibrating system and the chamber being connected to a second component of the vibrating system, characterised in that structure is provided to relieve the fluid pressure behind the piston to allow substantially unopposed piston movement in the chamber without damping forces being provided, during piston movements which occur in response to vibrations in the vibrating system at frequencies other than a fundamental frequency which the damping apparatus primarily is intended to damp.

7 Claims, 3 Drawing Sheets

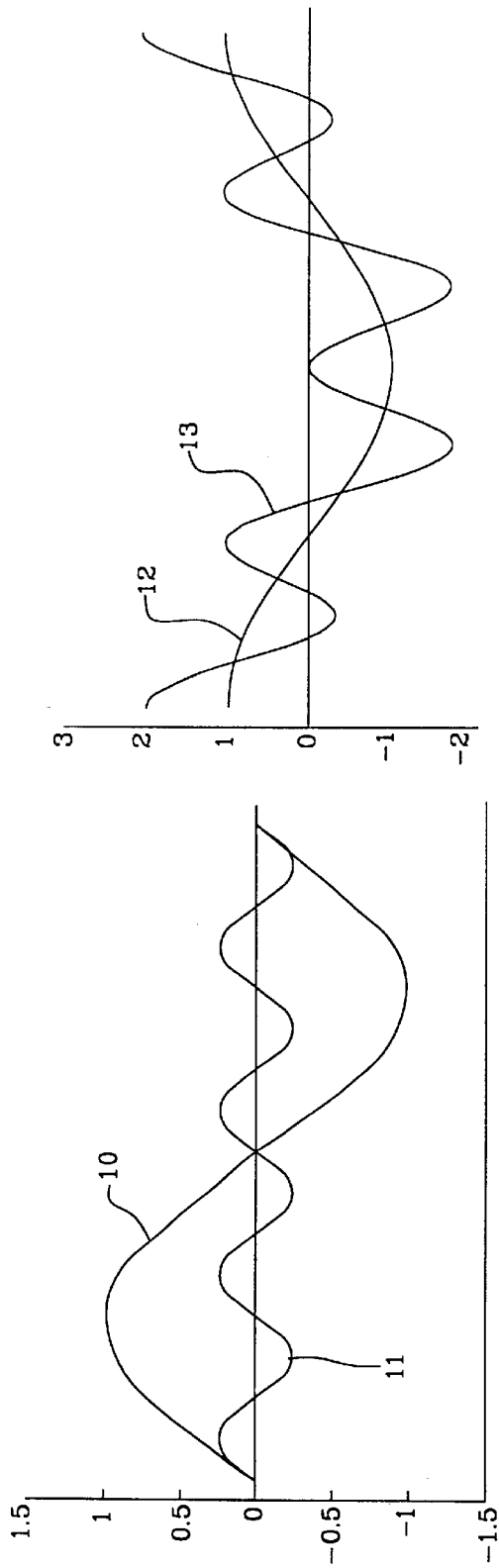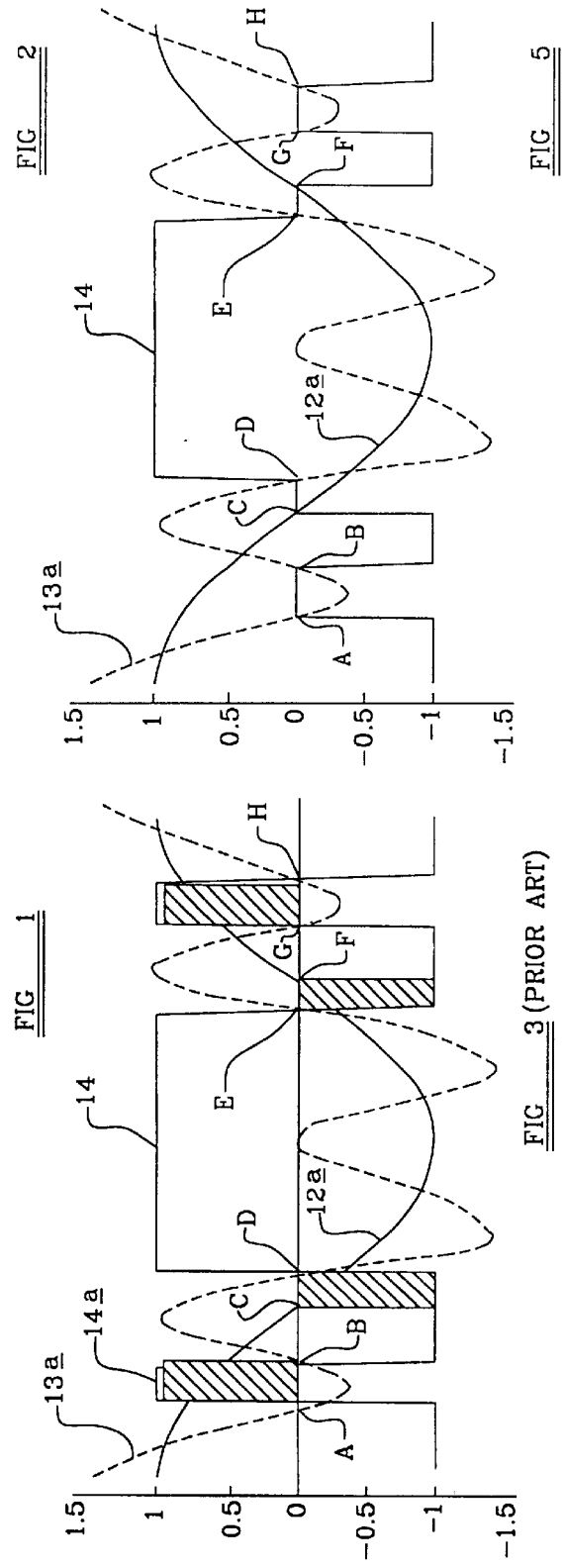

VIBRATION DAMPING APPARATUS

BACKGROUND OF THE INVENTION

This invention relates to a vibration damping apparatus for damping vibrations in a vibrating system.

DESCRIPTION OF THE PRIOR ART

Hydraulic dampers are known for use in helicopter rotor systems for example, for damping helicopter blade movements in a plane of rotation as the blades rotate (so called "lead lag dampers"), which vibrations can give rise to a phenomenon known as ground resonance, although similar hydraulic dampers are provided in other vibrating systems to damp vibrations.

In one form of damping apparatus, the apparatus includes a piston movable in a chamber in response to vibrations, piston movement being resisted by fluid pressure in the chamber at either side of the piston. Restricted fluid flow from one side of the piston to the other is permitted so that the piston may move in the chamber whilst providing damping forces to counteract such piston movements and provide damping.

Mechanical vibrating systems employing such hydraulic damping apparatus may experience modes of vibration other than at a fundamental frequency which primarily it is desired to damp. Such additional vibrations need not necessarily require damping, but the operation of a damping apparatus which responds to such additional vibrations may result in unnecessarily high damping forces which the surrounding structure will have to be strengthened to support.

In an effort to alleviate this problem it is known to incorporate into the damping apparatus a load limiting device such as a pressure relief valve, which limits the maximum damping force which can be provided by relieving fluid pressure at either side of the piston when high fluid pressures are produced. However such devices tend to degrade the ability of the damping apparatus to produce useful damping forces to damp the fundamental frequency, particularly in the presence of higher additional frequency vibrations since during part of each oscillation forces will be produced which assist the motion which it is intended to damp.

SUMMARY OF THE INVENTION

According to one aspect of the invention we provide a damping apparatus for damping vibrations in a vibrating system including a piston which is reciprocally movable in a fluid filled chamber, piston movement in either direction of movement being resisted by fluid pressure in the chamber behind the piston, which resistance provides damping forces which act to oppose piston movement, the piston being connected to one component of the vibrating system and the chamber being connected to a second component of the vibrating system, characterised in that means are provided to relieve the fluid pressure behind the piston to allow substantially unopposed piston movement in the chamber without damping, forces being provided during, piston movements which occur in response to vibrations in the vibrating system at frequencies other than a fundamental frequency which the damping apparatus primarily is intended to damp.

Thus in circumstances where the generation of unwanted damping forces in response to vibrations at frequencies other than a fundamental frequency it is desired to damp, can act in the same direction as the disturbing force giving rise to the fundamental vibrating frequency, damping forces are relieved. Thus the damping apparatus can be tuned to provide damping forces primarily in response to vibrations at the fundamental frequency.

In one embodiment the fluid pressure relief means includes a fluid by-pass means which has a first passage for fluid including a first one way valve means which permits substantially unopposed flow of fluid through the passage from a first side of the piston to an opposite second side of the piston, and a second passage for fluid including a second one way valve means which permits substantially unopposed flow of fluid through the passage from the second side of the piston to the first side, and a fluid control means which controls the flow of fluid through one or other of the first and second passages of the by-pass means depending upon the direction of the velocity of the fundamental vibrations frequency to be damped.

An actuating means may be provided to operate the control means in response to the direction of the velocity of the fundamental frequency vibrations to be damped and to changes in the direction.

Thus irrespective of the direction of the disturbing force giving rise to vibrations other than at the fundamental frequency, the fundamental vibrating frequency is damped at least when fluid flow through the by-pass means, is prevented.

The actuating means may include velocity direction responsive means, such as an accelerometer, for sensing the direction of the velocity of the fundamental frequency it is desired to damp.

Typically the damping apparatus includes a first restricted fluid flow path for fluid from a first side of the piston to a second side of the piston so that when fluid flow through the by-pass means is prevented, piston movement in the chamber in a first direction is permitted controlled by the rate of fluid flow through the first fluid flow path, and a second restricted fluid flow path is provided for fluid from the second side of the piston to the first side so that when fluid flow through the by-pass means is prevented, piston movement in the chamber in a second direction is permitted controlled by the rate of fluid flow through the second fluid flow path.

According to a second aspect of the invention we provide a vibrating system including a damping apparatus of the first aspect of the invention.

According to a third aspect of the invention we provide a helicopter including a rotor system having at least one damping apparatus of the first aspect of the invention.

BRIEF DESCRIPTION OF THE DRAWINGS

The invention will now be described with reference to the accompanying drawings in which:

FIG. 1 is a diagram showing the relative displacement in time of one component of a vibrating system relative to another component at a fundamental and another vibrating frequency arising in the system;

FIG. 2 is a diagram of the corresponding velocity of the components due to vibrations at the fundamental frequency, and the total resultant relative velocity due to vibration is at the fundamental frequency and the other frequency indicated in FIG. 1;

FIG. 3 is a diagram similar to FIG. 2 but superimposing a typical damping force response to the total resultant velocity of a prior art hydraulic damping apparatus;

FIG. 5 is a diagram similar to FIG. 3 but superimposing a damping force response to the total resultant velocity of using damping apparatus in accordance with the present invention.

DESCRIPTION OF THE PREFERRED EMBODIMENTS

Figure 4:
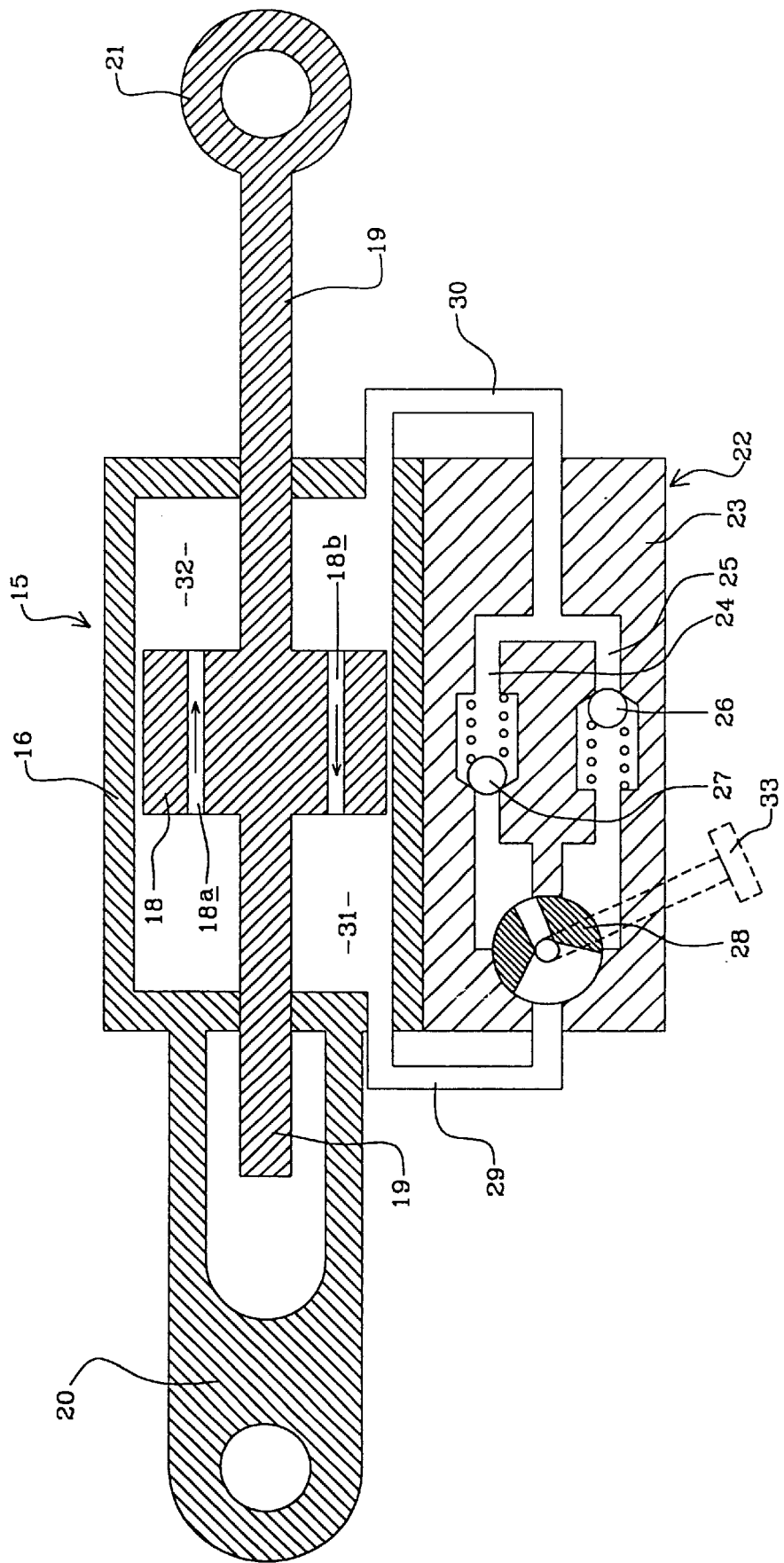
FIG. 4 is an illustrative side cross sectional view of a damping apparatus in accordance with the invention.
Figure 6:
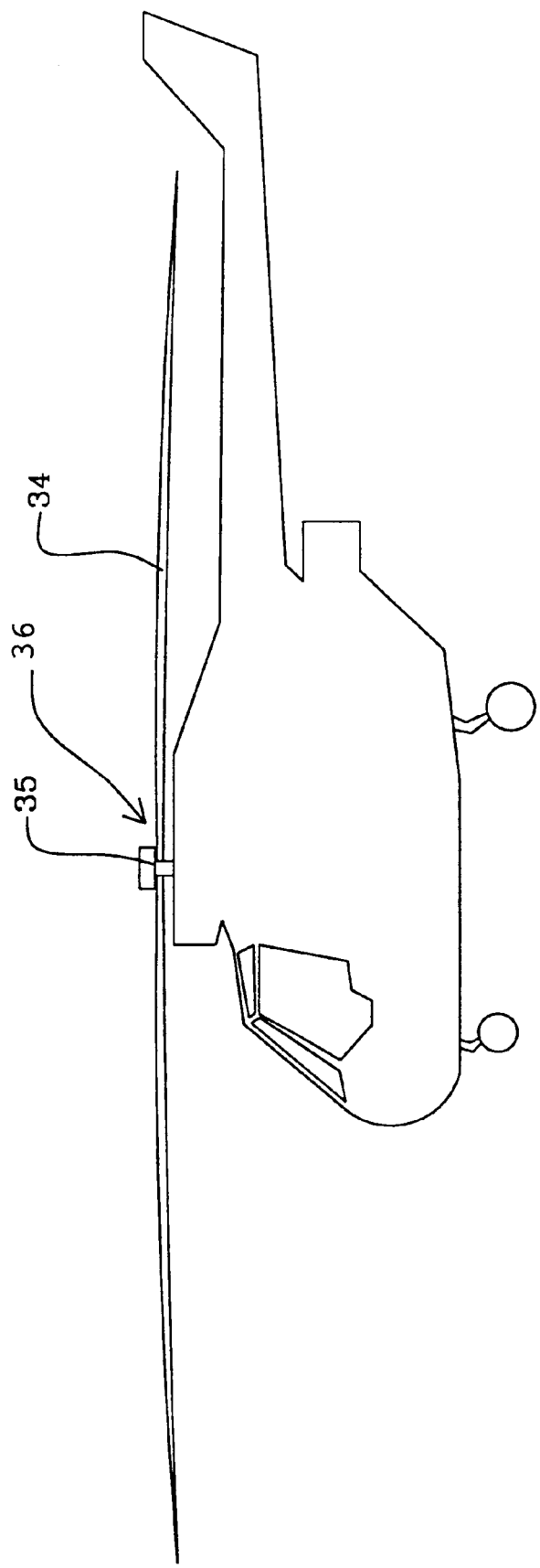
FIG. 6 is an illustration of a helicopter including a rotor system including a damping apparatus in accordance with the invention.

Referring to FIG. 4 and FIG. 6, in a vibrating system such as a helicopter rotor system 36 (which is shown in FIG. 6 as the main sustaining rotor, but may alternatively be the tail rotor) a first component such as a rotor blade 34, is attached in use to a piston 18 of a vibration damping apparatus 15, and a second component such as a rotor hub 35 is attached to a chamber 16 of the damping apparatus 15, the piston 18 being adapted thus to be attached by means of a first attachment formation 21 at one end of a piston rod 19 which is connected to the piston 18. The chamber 16 is adapted to be attached to the second component by means of a further attachment formation 20.

The first and second components in use, will relatively vibrate due to disturbing forces to which they are subjected.

Piston 18 movement in the chamber 16 is however resisted by fluid pressure in the chamber 16 behind the piston 18. When the piston 18 is urged in a first direction i.e. to the left as seen in the drawing, hydraulic fluid in the chamber 16 behind the piston 18 may pass from a first side 31 of the piston 18 to a second side 32 of the piston 18 through a flow path 18a through the piston 18. However the flow path 18a is restricted and as a result damping forces which oppose piston 18 movement will be provided. When the piston 18 is urged in an opposite second direction i.e. to the right in the drawing, fluid may flow from the second side 32 behind the piston 18 through a second flow path 18b through the piston 18, again in a restricted manner to provide a damping force to oppose piston 18 movement. Moreover, each fluid path 18a, 18b through the piston 18 has a one way valve (not shown) in this example so that only fluid flow in response to one or other first or second direction of piston movement can occur.

In this example, the piston rod 19 extends from the attachment means 21 beyond the piston 18 through an opening in the axial end of the chamber 16 wall so that the piston 18 is positively guided throughout its entire range of movement.

In another example, a single flow path 18a or 18b may be provided for the fluid, without any one way valve means, or a restricted flow path external of the chamber 16 may be provided, but in each case, piston 18 movements in the chamber 16 in response to vibrations in the vibrating system are opposed by the hydraulic or other fluid in the chamber 16 behind the piston 18.

In FIG. 1 there is illustrated a waveform 10 of a fundamental high amplitude (displacement) low frequency vibration such as might be experienced by a helicopter rotor blade as a result of transient disturbances of the rotor in the plane of rotation, and a waveform 11 of a relatively low amplitude high frequency vibration which result from normal forced oscillations of the rotor in flight. In the example shown, it is desired primarily to damp the high amplitude low frequency vibration 10 to prevent a phenomenon known as ground resonance. In this example the frequency of the low amplitude higher frequency vibrations is shown as being four times the frequency of the fundamental frequency vibrations it is desired to damp, but this ratio may differ in other operating conditions and/or other vibrating systems.

The product of the amplitude and frequency of the respective vibrations provides a resultant velocity waveform. The velocity of the fundamental frequency 10 of FIG. 1 is shown at 12 in FIG. 2, and the sum of the velocities of the high and low frequency waveforms 10 and 11 of FIG. 1 i.e. the total resultant velocity, is shown at 13 in FIG. 2. It will be appreciated that the low amplitude high frequency vibrations 11 of FIG. 1 make a greater contribution to the total resultant velocity at 13 in FIG. 2 than the low frequency vibrations 10.

In a damping apparatus such as that shown at 15 in FIG. 4, relative movement between the piston 18 and chamber 16 occurs in response to relative movement of the vibrating components, but in a conventional damping apparatus, the damping forces which are produced to damp such vibrations are a function of the total resultant velocity 13 of the vibrating components. Thus in the vibrating system described with reference to FIGS. 1 and 2, conventionally damping forces will be provided as a function of the total resultant velocity 13.

A typical damping force response 14 of a conventional hydraulic damping apparatus to total resultant velocity of the vibrating components is illustrated in FIG. 3. The velocity waveform of the fundamental frequency which is required to be damped, is shown at 12a, and the total resultant velocity waveform of the vibrating system is shown at 13a.

It can be seen that the damping apparatus responds to the resultant velocity 13a by providing rapid reversals in the direction of applied damping force 14. Thus for some phases of operation, which are the areas which are cross hatched, the damping forces produced act in the same direction as the disturbing force augmenting the low frequency vibrations 12a it is desired to damp, and so rather than damping the fundamental frequency vibrations 12a, the damping force produced tends to assist the disturbing force. Particularly, at the position indicated at A in FIG. 3, the resultant velocity 13a changes direction, and the damping force provided changes direction to compensate and to attempt to damp the resultant velocity 13a. However the damping force thus provided, indicated at 14a, is in the same direction as the velocity of the fundamental frequency vibrations 12a, and thus the performance of the damping apparatus to damp the vibrations at the fundamental frequency is substantially degraded in this phase of operation.

Referring to FIG. 4 it can be seen that the damping apparatus 15 in accordance with the invention includes a fluid by-pass means 22 which in certain phases of operation of the damping apparatus 15, relieves fluid pressure behind the piston 18.

The by-pass means 22 includes a first fluid passage 24 and a second fluid passage 25, each passage 24, 25 including a one way valve means 26 and 27 respectively. A switchable controller 28 is also provided which in this embodiment is a cylindrical rotatable valve member which, depending upon the rotational position, either permits fluid flow through the by-pass means 22 via the first fluid passage 24, which is the rotational position shown in the figure, or permits fluid flow through the second fluid passage 25. The controller 28 is in fluid communication with the chamber 16 at the first side 31 of the piston 18 via a line 29, and each of the passage 24, 25 are in fluid communication with the chamber 16 at the second side 32 of the piston 18 via a line 30.

Thus when the controller 28 is rotated to a first open position, as shown, fluid may flow from the first side 31 of the piston 18 through the first passage 24, past the one way valve 27 therein, to the second side 32 of the piston 18 in response to piston 18 movement to the left i.e. in the first direction, and conversely, when the controller 28 is rotated to a second open position opposite to that shown in the drawings, fluid may flow from the second side 32 of the piston 18 through the second passage 25, past the one way valve 26 therein, to the first side 31 of the piston 18 in response to piston 18 movement in the second direction i.e. to the right.

When the controller 28 is rotated to either the first or second open position, the flow passages 24 and 25 and the lines 29 and 30 are dimensioned such that fluid flow from either respective side 31, 32 of the piston 18 to the other side 32, 31 respectively, no or substantially no damping forces to oppose piston 18 movement in the chamber 16 are provided.

The controller 28 is operated by an actuating means 33 shown purely diagramatically which responds to changes in the direction of the velocity 12a of the low frequency high amplitude vibrations it is desired to damp. The actuating means 33 may be a sensor such as an accelerometer, pendulum or similar device, which is adapted to sense changes in direction of the velocity 12a and rotates the controller 28 to an appropriate first or second open position so that damping forces are not provided which otherwise would assist the disturbing force giving rise to the fundamental frequency vibrations.

Referring to FIG. 5, when the velocity 12a of the fundamental frequency vibrations is positive, the actuating means 33 may move the controller 28 to the position shown in FIG. 4. The controller 28 remains in this position even when the direction of the total resultant velocity 13a of the vibration changes, i.e. at the position indicated at A because it is tuned to respond only to the low frequency vibrations 12a. By virtue of the by-pass means 22 though, at position A fluid may freely flow through passage 24 and the one way valve 27 therein in response to piston 18 movement in the first direction, so that the damping force is prevented. When the total resultant velocity 13a of the vibrations changes direction again, i.e. at position B, fluid flow through the by-pass means 22 will be prevented by the one-way valve 27 and thus damping forces will again be applied to oppose piston movement in the second direction.

As illustrated in FIG. 5, before the resultant velocity 13a again changes direction, at position D, the velocity of the fundamental frequency vibrations 12a will change direction i.e. to negative at position C. As a result, the actuating means 33 will cause the controller 28 to rotate to the second, opposite open position in which first side 31 of the piston 18 is in communication with the passageway 25 of the by-pass means 22. Thus piston 18 movement in the second direction (from left to right as seen in the drawing), i.e. due to the resultant velocity 13a being positive, will result in no damping forces being applied as fluid may freely flow through passageway 25 and the one way valve 26 therein from the second side 32 of the piston 18 to the first side 31.

When the resultant velocity 13a again goes negative, i.e. at position D, fluid flow through the by-pass means 22 will be prevented by the one way valve 26 and consequently damping forces in the first direction to oppose vibrations at the fundamental frequency 12a will be provided. Whilst the resultant velocity 13a and the velocity 12a of the fundamental frequency vibrations both remain negative, i.e. until position E indicated in FIG. 5, damping forces will continue to be applied. At position E, where the resultant velocity 13a again goes positive but the velocity 12a of the fundamental frequency vibrations remains negative, to prevent the damping forces contributing to the disturbing forces giving rise to the vibrations at the fundamental frequency, the damping forces are relieved by fluid flow through passageway 25 and one way valve 26 of the by-pass means 22.

At the position indicated at F in FIG. 5, the velocity of the fundamental frequency vibration 12a again changes direction, and as a result the actuating means 33 moves the controller 28 back to the position shown in FIG. 4 and damping forces will again be imposed. At position G shown in FIG. 5, damping forces are again prevented as the resultant velocity 13a again changes direction, and fluid may flow through passageway 24 and one way valve 27 of the by-pass means 22, until the resultant velocity 13a again changes direction at position H when damping forces will again be applied.

Thus in all positions where the provision of a damping force would assist the disturbing force giving rise to the fundamental frequency vibrations it is desired to damp, such damping forces are prevented by the by pass means 22 of this invention.

Various modifications may be made without departing from the scope of the invention. For example although an actuating means 33 being an accelerometer has been described to actuate the controller 28 in response to changes in the direction of the velocity of the fundamental frequency vibrations, any other suitable velocity direction responsive means may be provided.

What is claimed is:

1. A damping apparatus for damping vibrations in a vibrating system including a piston which is reciprocally movable in a fluid filled chamber, piston movement in either direction of movement being resisted by fluid pressure in the chamber on one side of the piston, which resistance provides damping forces which act to oppose piston movement, the piston being connected to one component of the vibrating system and the chamber being connected to a second component of the vibrating system, said damping apparatus further comprising a fluid pressure relief device for relieving the fluid pressure on the piston during movement thereof so as to allow substantially unopposed piston movement in the chamber without damping forces being provided during piston movements which occur in response to vibrations in the vibrating system at frequencies other than a fundamental frequency which the damping apparatus primarily is intended to damp, the fluid pressure relief device including a fluid by-pass conduit and a fluid control device which controls the flow of fluid through the fluid by-pass conduit depending on the direction of the velocity of the fundamental frequency vibrations to be damped.

2. An apparatus according to claim 1 wherein the fluid by-pass conduit includes a first passage for fluid including a first one way valve means for permitting substantially unopposed flow of fluid through the passage from a first side of the piston to a second, opposite side of the piston, and a second passage for fluid including a second one way valve means for permitting substantially unopposed flow of fluid through the passage from the second side of the piston to the first side, and wherein said fluid control device controls the flow of fluid through one or other of the first and second passages of the by-pass conduit depending on the direction of the velocity of the fundamental frequency vibrations to be damped.

3. An apparatus according to claim 2 further comprising an actuating means for sensing the direction of the velocity of the fundamental frequency vibrations to be damped and for actuating the fluid control device in response thereto.

4. An apparatus according to claim 3 wherein the actuating means includes an accelerometer.

5. An apparatus according to claim 1 wherein the damping apparatus includes a first restricted fluid flow path for fluid from a first side of the piston to a second side of the piston so that when fluid flow through the by-pass conduit is prevented, piston movement in the chamber in a first direction is permitted and is controlled by the rate of fluid flow through the first fluid flow path, and wherein the damping apparatus further includes a second restricted fluid flow path for fluid from the second side of the piston to the first side so that when flow through the by-pass conduit is prevented, piston movement in the chamber in a second direction is permitted and is controlled by the rate of fluid flow through the second fluid flow path.

6. A vibrating system including at least one damping apparatus, the damping apparatus including a piston which is reciprocally movable in a fluid filled chamber, piston movement in either direction of movement being resisted by fluid pressure in the chamber on the side of the piston, which resistance provides damping forces which act to oppose piston movement, the piston being connected to one component of the vibrating system and the chamber being connected to a second component of the vibrating system, said at least one damping apparatus further comprising a fluid pressure relief device for relieving the fluid pressure on the piston during movement thereof so as to allow substantially unopposed piston movement in the chamber without damping forces being provided during piston movements which occur in response to vibrations in the vibrating system at frequencies other than a fundamental frequency which the damping apparatus primarily is intended to damp, the fluid pressure relief device including a fluid by-pass conduit and a fluid control device which controls the flow of fluid through the fluid by-pass conduit depending on the direction of the velocity of the fundamental frequency vibrations to be damped.

7. A helicopter including a rotor system including a damping apparatus, the damping apparatus including a piston which is reciprocally movable in a fluid filled chamber, piston movement in either direction of movement being resisted by fluid pressure in the chamber on one side of the piston, which resistance provides damping forces which act to oppose piston movement, the piston being connected to one component of the rotor system and the chamber being connected to a second component of the rotor system, said damping apparatus further comprising a fluid pressure relief device for relieving the fluid pressure on the piston during movement thereof so as to allow substantially unopposed piston movement in the chamber without damping forces being provided during piston movements which occur in response to vibrations in the rotor system at frequencies other than a fundamental frequency which the damping apparatus primarily is intended to damp, the fluid pressure relief device including a fluid by-pass conduit and a fluid control device which controls the flow of fluid through the fluid by-pass conduit depending on the direction of the velocity of the fundamental frequency vibrations to be damped.

* * * * *